United States Patent

Silk

[11] Patent Number: 4,830,391
[45] Date of Patent: May 16, 1989

[54] MOTOR CYCLE RISING RATE SUSPENSION

[75] Inventor: George R. Silk, Sandiacre, England

[73] Assignee: Silk Engineering (Derby) Limited, Derby, England

[21] Appl. No.: 150,907

[22] Filed: Feb. 1, 1988

[30] Foreign Application Priority Data

Feb. 4, 1987 [GB] United Kingdom ............... 8702425

[51] Int. Cl.4 ............................................. B62K 25/20
[52] U.S. Cl. .................................... 280/284; 180/227
[58] Field of Search .................. 180/219, 227, 231; 280/284, 285, 286, 276, 277, 283, 275, 288

[56] References Cited

U.S. PATENT DOCUMENTS

| 1,071,892 | 9/1913 | Diepenhorst et al. | 280/284 |
| 1,148,170 | 7/1915 | Incerti | 280/284 |
| 4,506,755 | 3/1985 | Tsuchida et al. | |
| 4,511,013 | 4/1985 | Miyakoshi et al. | 180/227 |
| 4,540,193 | 9/1985 | Noda et al. | |
| 4,556,119 | 12/1985 | Shiratsuchi | |

FOREIGN PATENT DOCUMENTS

| 498559 | 2/1951 | Belgium | 280/284 |
| 104426 | 4/1984 | European Pat. Off. | |
| 170345 | 2/1952 | Fed. Rep. of Germany | 280/284 |
| 16825 | 10/1919 | United Kingdom | 280/284 |
| 596081 | 12/1947 | United Kingdom | 280/284 |
| 2045178 | 10/1980 | United Kingdom | |
| 2066749 | 7/1981 | United Kingdom | |
| 2086319 | 5/1982 | United Kingdom | |
| 2092532 | 8/1982 | United Kingdom | |
| 2123764 | 2/1984 | United Kingdom | |
| 2159108 | 11/1985 | United Kingdom | |

Primary Examiner—Charles A. Marmor
Assistant Examiner—Everett G. Diederiks, Jr.
Attorney, Agent, or Firm—Oliff & Berridge

[57] ABSTRACT

A motor cycle rear wheel suspension linkage to provide a rising rate suspension comprises a link (30) pivotally attached at (32) to a motor cycle frame (4) and to a shock absorber (18) at (34). A roller (26) mounted on the rear wheel swing arm (14) engages in a cam slot (28) in the link (30).

6 Claims, 3 Drawing Sheets

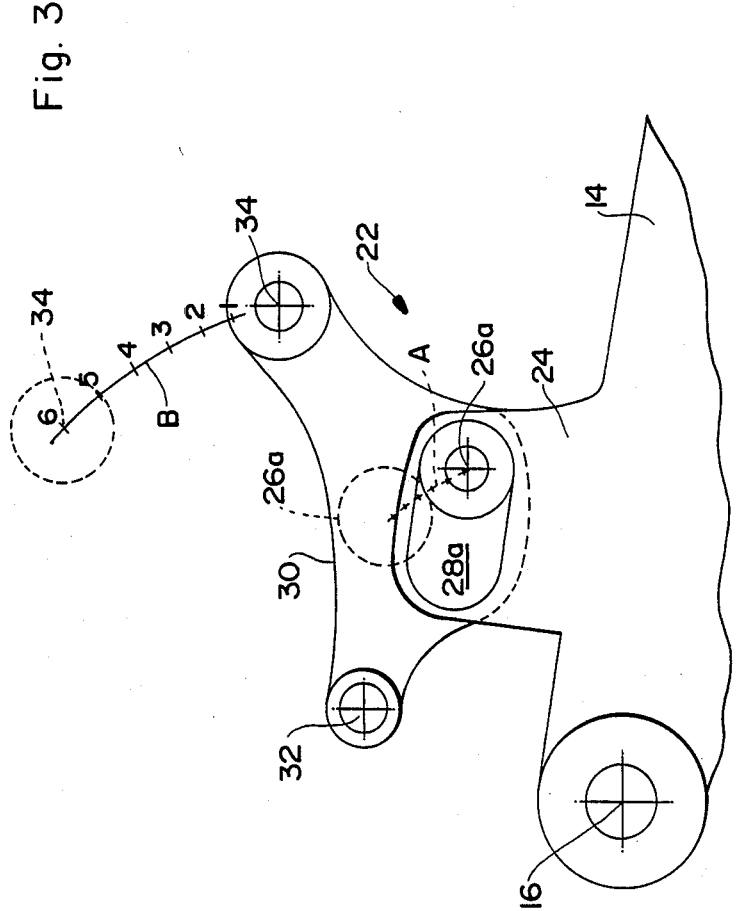

MOTOR CYCLE RISING RATE SUSPENSION

BACKGROUND OF THE INVENTION

This invention relates to suspension units for motor vehicles and is particularly though not exclusively concerned with suspension units for motor cycles.

In a motorcycle rear wheel suspension unit, the spindle of the rear wheel of a motor cycle is usually mounted in a swing arm mounted on a pivot which is located adjacent to or coincident with the drive sprocket of the motor cycle engine. The drive sprocket is mounted on the output shaft of a gear box which with the engine is secured to or forms part of the motor cycle frame and a shock absorber or damper is mounted on each side of the rear wheel to the swing arm and to the motor cycle frame. In such an arrangement the damping force applied by each suspension unit varies in direct relation to the displacement of the rear wheel pivoted arm.

SUMMARY OF THE INVENTION

The present invention seeks to provide a suspension linkage in which the damping force applied to the swing arm by one or more shock absorbers is modified indirectly of the movement of the swing arm.

According to the present invention there is provided a suspension linkage for a motor cycle comprising a swing arm for the rear wheel of a motor cycle, one end of the swing arm being pivotally attachable to a fixed part of a motor cycle, the other end of the swing arm being arranged to receive a spindle of a motor cycle rear wheel, and at least one pivotable suspension link pivotally securable to a fixed part of a motor cycle, and pivotally securable to a shock absorbing means, the other end of the shock absorbing means being securable to a fixed part of a motor cycle, the swing arm having a portion thereof secured to and movable relative to the at least one suspension link.

The shock absorbing means can comprise one or more shock absorbers. The suspension link can include a cam slot engageable by a roller attached to the swing arm. Alternatively, the suspension link can include a roller engageable with a cam slot or track formed in a portion of the swing arm.

BRIEF DESCRIPTION OF THE DRAWINGS

The present invention will now be more particularly described with reference to the accompanying drawings in which:

FIG. 3 shows a detail of another embodiment of the present invention.

DETAILED DESCRIPTION

Figure 1:
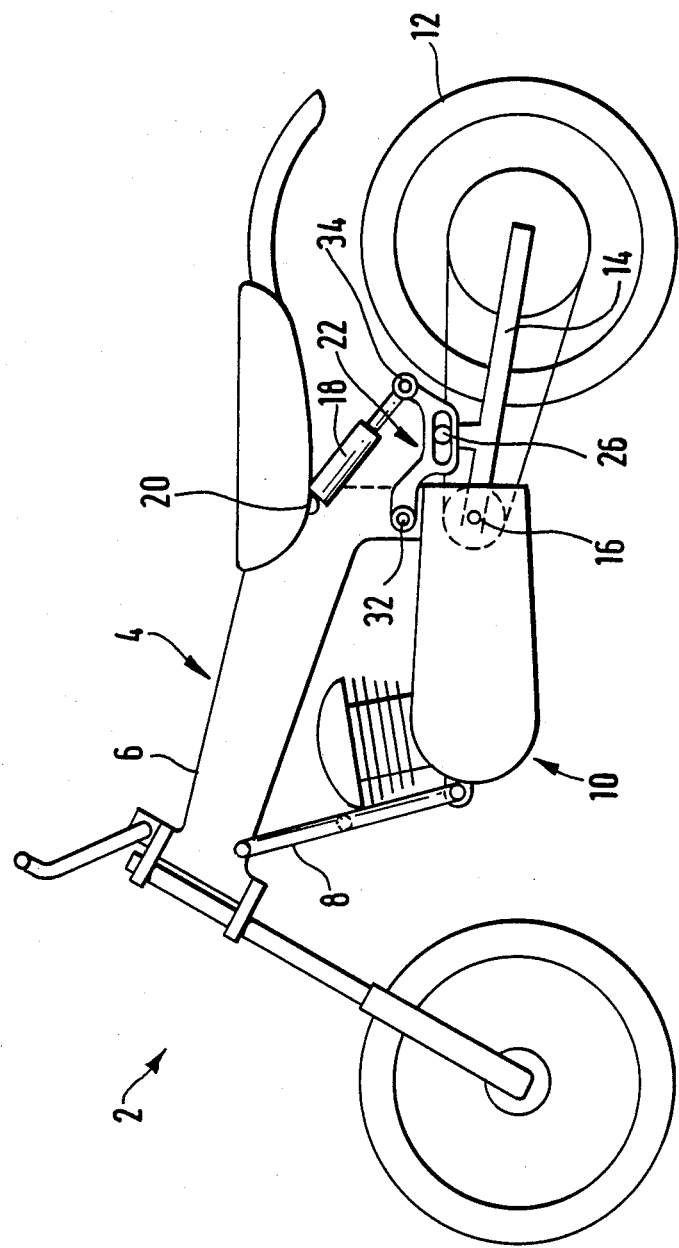
FIG. 1 shows a motor cycle incorporating one form of suspension linkage according to the present invention.
Figure 2:
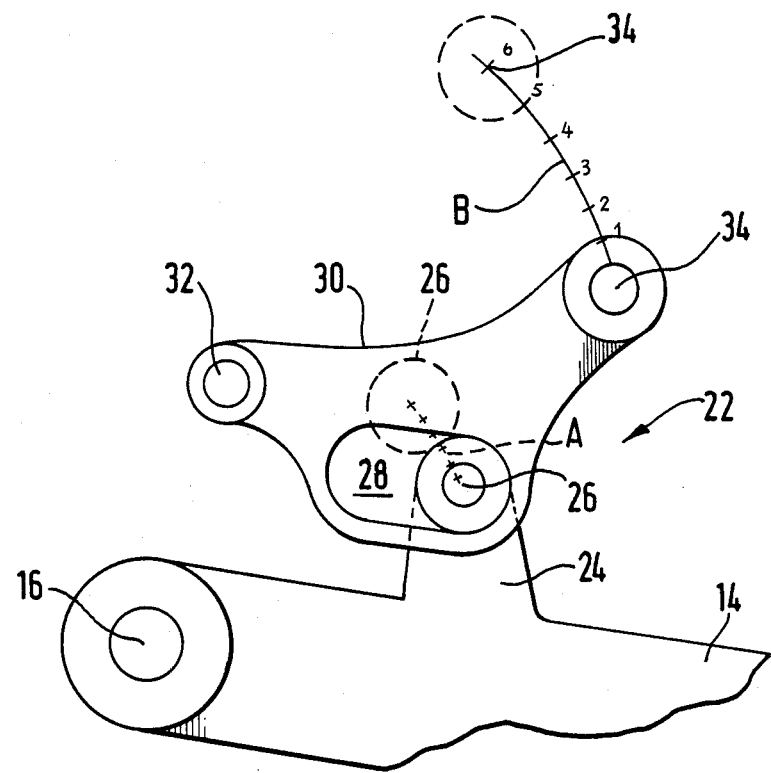
FIG. 2 shows a detail of the suspension linkage shown in FIG. 1.

Referring to FIGS. 1 and 2, a motor cycle 2 comprises a frame 4 which consists of a top frame member 6, down tubes 8, and an engine and gear box assembly 10 which forms part of the frame 4. The motor cycle has a rear wheel 12 mounted in a swing arm 14 which is pivoted at 16 on the frame or engine, the swing arm being in the form of a fork. A shock absorber 18 is attached to the frame 4 at 20 and to the swing arm by a linkage 22 of a parallelogram type.

Referring more particularly to FIG. 2, the swing arm 14 has an extension 24 having a rotatable roller 26 which is movable within a cam slot 28 of a suspension link 30. The suspension link 30 is pivoted to the frame 4 or engine at 32 and is attached to the lower end of the shock absorber 18 at 34.

As the swing arm 14 moves on the pivot 16, the roller 26 will move in the cam slot 28 of the suspension link 30. This movement will vary the motion of the pivot 34 as compared to a direct connection between the shock absorber 18 and the swing arm 14. The roller 26 will rise in an arc A having as center the pivot 16 which is constant with that of the spindle of the rear wheel 12 attached to the arm 14. The link 30 rises in an arc B having as center the pivot 32. Thus there is a differential rate of rise because of the different pivot centers 16 and 32.

The roller 26 is retained in a desmodromic mode to contain the movement of the shock absorber relative to the arcuate motion of the spindle of the rear wheel.

While the suspension link 30 has been shown with a cam slot 28 engaging a roller 26 attached to the swing arm 14, the engagement can comprise a roller 26a rotatable about a fixed axis on the link engageable with a cam slot or track 28a on the extension 24 on the swing arm.

The differential rate of rise, and the compression lengths of each shock absorber can be varied by altering the attachment locations of the suspension link or links to the frame, swing arm and shock absorber. Also these factors can be varied by altering the geometry of the suspension link, in particular the shape of the cam slot and the relative positions of the pivots 32 and 34. For example, the cam slot can be straight as described, arcuate, or follow any continuous curvilinear path, depending upon the differential rate of rise required.

I claim:

1. A suspension linkage on a vehicle having a frame, comprising a swing arm for a rear wheel of the vehicle, one end of the swing arm being pivotally attached to a fixed part of the vehicle, the other end of the swing arm receiving a spindle of a vehicle rear wheel, and at least one pivotable integral suspension link, the suspension link being pivotally secured to a fixed part of the vehicle and pivotally secured to one end of shock absorbing means, said suspension link including a cam slot, the other end of the shock absorbing means being secured to a fixed part of the vehicle, the swing arm having a portion thereof directly pivotably secured to and slidably movable relative to the at least one suspension link within said slot.

2. A suspension linkage as claimed in claim 1 in which the cam slot is engaged by a roller attached to the swing arm.

3. A suspension linkage as claimed in claim 2 in which the roller is attached to the swing arm by an extension piece.

4. A suspension linkage as claimed in claim 1, in which the shock absorbing means comprises at least one shock absorber.

5. A suspension linkage as claimed in claim 1, wherein said vehicle is a motor cycle.

6. A suspension linkage on a vehicle having a frame, comprising a swing arm for a rear wheel of the vehicle, one end of the swing arm being pivotally attached to a fixed part of the vehicle, the other end of the swing arm receiving a spindle of a vehicle rear wheel, said swing arm including a cam slot, and at least one pivotable integral suspension link, the suspension link being pivotally secured to a fixed part of the vehicle and pivotally secured to one end of shock absorbing means, the other end of the shock absorbing means being secured to a fixed part of a the vehicle, the suspension link having a portion thereof directly pivotably secured to and slidably movable relative the swing arm within said slot.

* * * * *